Patented May 3, 1932

1,856,763

UNITED STATES PATENT OFFICE

WESLEY C. L. HEMEON, OF ROCKLAND, MAINE, ASSIGNOR TO ROCKLAND & ROCKPORT LIME CORPORATION, OF ROCKLAND, MAINE, A CORPORATION OF MAINE

PROCESS OF PRODUCING LIME PRODUCT

No Drawing. Application filed February 15, 1930. Serial No. 428,830.

My invention relates to a process for producing a lime plaster which has unusual and novel properties of importance to the artisan user of such plasters and a product heretofore unknown in use.

Heretofore quicklime for plaster has always, according to the present state of the art, had to be slaked with excess of water when prepared by the artisan who uses it, to a paste or putty and this must be aged for from two to three days to several weeks, according to its quality before using.

The reason for this is that there are always in the commercial product constituents that unite with water very slowly and when a lime mortar is applied too soon after slaking the setting, drying and hardening of the plaster take place because of the exposure to the atmosphere before the slow slaking constituents have satisfied their affinity for water.

Like the normal slaking lime these slow slaking constituents increase in volume upon uniting with water. The result is that after hardening of the plaster these slow slaking constituents continue to slake until their water requirements are entirely satisfied and since they are surrounded by rigid plaster the expansion during that process results in a breaking of the plaster in the immediate vicinity and "pops" and "pits" are the visible effect or in extreme cases nearly complete disintegration. Aging of the slaked lime allows all constituents to slake while the mortar is in its original plastic and unhardened condition and it is universal practice to so age lime putty before using.

My product I believe to be unique and as such constitutes a new basis of building operation by which much time can be saved and a more perfect structural result attained. In considering my invention from the manufacturing viewpoint there has been a considerable advance in the art.

Two outstanding steps have been taken by producers of lime for plastering looking toward obviating the necessity of aging quicklime, both of which are improvements over old products, namely, the crude lump lime, but even they fall far short of being ideal. Both require at least one full day of aging before using and have other disadvantages described in the following sections.

One is that process which produces dry hydrate, in which is removed by screen or air separation, a portion of the undesirable impurities and/or slow slaking constituents. Such removal together with the fact that there is usually an aging interval of weeks between manufacture and use results in lime that if used immediately upon mixing to a putty with water will produce a plastered surface free from holes or pops. This advance in the art was of advantage but left much to attain.

The other practice that has resulted in an improvement over lime in the lump form is the growing one of grinding the quicklime to a fine powder and marketing it in that form. It is unnecessary to age the putty made by slaking such a pulverized lime for so great a length of time. It is, however, still usually necessary to age such putty for at least two days.

The shortcomings of the above named improved processes are great. In the first case, where a dry hydrated lime is produced, although it may be used without any aging from the standpoint of immunity from pops or pits, it is not so usable practically for another reason.

For certain purposes wherein it is the practice to spread a thin connected layer of the lime paste or putty on a porous, water-absorbent surface, as for example on walls and ceilings whose base is any sanded plaster, or brickwork, concrete, fabric, etc. the lime putty prepared from the dry powdered hydrated lime is, in the parlance of the trade, non-plastic or rubbery.

The present usual interpretation of the reaction thus involved as usually accepted by those skilled in the art, is that the plastic putty is one which retains the water surrounding its particles with greater tenacity than does the non-plastic putty. This results in the case of the former, in the greater lubrication of the surfaces of the particles relative to each other during the spreading action of the trowel.

With a plastic putty a thin, smooth and connected layer can be spread on an absorbent surface using a trowel or similar tool with a very small amount of muscular effort. With a non-plastic or rubbery putty, tremendous muscular effort is required to spread a layer at all, and the result is a layer that is not thin, not smooth and not a connected one, but is rather broken and curled away from the surface at intervals at right angles to the direction of the sweep of the trowel.

The products of such processes have been usable common products but have not afforded the ideal working basis desired in practical building operations. My invention provides a plaster product which is unique in its characteristics. It is capable of easy working which in the economy of time and labor is most advantageous. It may, therefore, be said that my product represents one of absolute novelty because of its ability to provide a plastered surface free from "pits" or "pops" with lesser requirements of time and skill on the part of the artisan than is necessary with materials at present in use.

Hydrated lime prepared with special care and from special types of limestone will make a plastic putty when mixed with water by the user, but it must be allowed to soak for nearly twenty four hours at the least. The introduction and sale to the trade of such "finishing hydrates" as they are termed, was a decided step forward because prior to that time it was necessary to prepare lime putty from quicklime and allow it to age several days before using.

In justice to the prior art and in contrast therewith there should be noted the advantages and the difficulties which were involved. A unit weight of quicklime made into a putty by the user will yield, approximately, double the volume of putty of working consistency obtained from the same unit weight of dry hydrated lime. Thus, it can be seen that quicklime has an important economic advantage over hydrated lime. Its shortcomings, however, often militate against its use.

To summarize the disadvantages of the two forms of lime; hydrated lime has to be soaked for at least one day before using in order to make it plastic enough for spreading purposes; the volume of material when made to a putty with water is much less than that from an equal weight of quicklime. Pulverized quicklime has to be soaked and aged for a somewhat longer period of time to eliminate danger of pitting or popping of the finished surface.

Under my invention herein disclosed all the advantages of hydrated lime are combined with those of quicklime with none of the disadvantages of either, resulting in a material that is entirely novel. Chemically, it is quicklime and its chief advantages are that it can be used immediately after slaking it with water; it yields the larger volume of putty characteristic of normal quicklimes; it is far more plastic than the hydrated lime; and, because it contains no water chemically combined, transportation cost is materially reduced.

In applying my process generally speaking, I successively (1) slake crude quicklime, (2) render the slow slaking constituents innocuous by any of several different methods, (3) add retarding compounds, and then (4) calcine the resultant hydrated lime at a temperature high enough to effect substantially complete decomposition thereof, water passing off as vapor. I call particular attention to the second and third steps wherein I render the slow slaking constituents of the lime innocuous and submit the material to a retarding treatment.

In eliminating by my process the harmful qualities of slow slaking constituents, a great many methods may be used. (1) They may be removed altogether or in part before calcination, or (2) they may be caused to slake completely, and the latter result may be accomplished (a) by aging without the external application of heat, or (b) aging with the external application of heat which considerably hastens the process. Removal may be accomplished variously (a) by screening the thin putty or milk after slaking of the crude quicklime; (b) by flotation in water and allowing the heavier impurities to settle to the bottom of the containing vessel; (c) by slaking to a dry hydrate and using air separation methods. In the case of some limes it might well be that the calcination process would destroy the harmful properties of the undesirable constituents.

I now discuss the retarding process. It is a well known fact that the product of the calcination of hydrated lime is a quicklime so finely divided that upon treatment with water, slaking takes place with such rapidity as to be nearly explosive. Such a material would not be useful for building purposes, for in the first place the violence of the slaking reaction is so great that it would rightly be considered an abominable nuisance by the artisans who would be required to perform that step. Secondly, the putty produced, unlike that from normal quicklimes, is of a granular nature in appearance and absolutely devoid of the plastic quality so desirable and necessary from the standpoint of the artisan who uses it.

I have discovered that the reaction can be suitably retarded by adding a very small amount of certain classes of soluble inorganic compounds like calcium chloride, sodium chloride, or sodium hydroxide, to the hydrated lime before calcination. An intimate mixture of the retarding compound with the lime must be attained which is readily accomplished by adding it in the form of a water solution to a paste or milk of the hydrated lime and mixing. On calcination of such a mixture a quicklime is produced which slakes at a rate dependent upon the concentration of retarding compound present. Presumably a thin film of soluble material is formed around each particle when the water is evaporated in the early stages of calcination, which, upon addition of water to the calcined material, must first be dissolved before slaking can take place. I have prepared quicklimes having wide ranges of slaking activity merely by varying the proportion of retarding compound.

I have successfully used the following compounds as retarding agents; calcium chloride, sodium hydroxide, sodium chloride, sodium carbonate, sodium borate, magnesium chloride, barium chloride, and sea salt.

The retarding compound may be any substance that results in one or more soluble compounds after the mixing and calcination processes have been completed. An organic chloride, for example, would be partially or wholly decomposed by the calcination process, but if chloride of calcium were the result after calcination were complete, then, obviously, the result is the same as though calcium chloride had been added in the beginning. Similarly, hydrochloric acid would form calcium chloride immediately upon mixing with the lime with the same final result as in the previous case. If sodium carbonate be used, calcium carbonate, an insoluble compound is formed but simultaneously sodium hydroxide appears by simple metathetical reaction and a satisfactory retarding action is had just as though sodium hydroxide had been first added as such.

As an example of a salt which is originally soluble but which lacks the desired effect because its reactions are such as to result in no soluble compound after calcination is complete is aluminum sulfate which immediately on coming in contact with calcium hydroxide forms by metathesis calcium sulfate and aluminum hydroxide both of which are insoluble compounds and therefore without the capacity for forming a soluble protective film over the particles of lime.

Certain characteristics of this process are of tremendous advantage to the manufacturer. There are wide variations in qualities of crude limes from the same plants. None but the best dare be marketed in the crude form for reasons explained previously—poorer grades contain greater proportions of slow slaking constituents which take longer to spend themselves the poorer the grade. Poor grade is largely due to the methods of calcining the original rock; an important fact is that limestone can be calcined much more economically if less attention need be paid to quality, using as a criterion of quality that established by present day practice in the use of crude quicklime.

In my process barriers of quality are to a large extent leveled. All harmful characteristics are destroyed by the second step of the process and it entails no greater cost to render a poor grade of lime suitable than it does to treat the better grade.

Although I have described the steps of my process as taking place in a definite sequence I do not wish it understood that such sequence is unalterable. Addition of retarding compounds, for example, may take place with the slaking water instead of after slaking. The only condition is that they be present before calcination of the slaked material. It is possible that deposits of limestone exist which upon calcination yield a quicklime that contains compounds that would suitably retard slaking when processed as described in this disclosure and according to the same mechanism. For such cases it would be unnecessary, obviously, to add retarding compounds, but in order to prepare successful building material the requisite step still remains of destroying the harmful qualities of such due to the presence of slow slaking constituents. My invention, therefore, embraces any processes whereby either step 2 or step 3 are omitted but not both.

Another phase of my invention is my further discovery that if the quicklime formed by the process above described be hydrated with only sufficient water to produce a dry hydrate of lime, that product will be one whose apparent or bulk specific gravity is much less than that of the hydrated lime formed directly from the original crude quicklime according to normal practice. Furthermore, inasmuch as it is not practically possible to rehydrate calcined hydrate which contains no retarding compound, the presence of such compounds renders the process entirely susceptible to control and this corollary process is a part of my invention.

Where it has been proposed to slake crude quicklime, dilute the slaked putty with water and separate heavy and gritty constituents by flotation, dry the purified lime putty and grind it to a pulverulent form, difficulty has always been experienced because of the tendency of such putty when dried to form a solid cake which resists mechanical disintegration action and makes it impossible to economically reduce. By my process such a gritless purified form of dry hydrated lime can be produced by adding a retarding compound and calcining the floated lime putty, instead of merely drying, after which ordinary mechanical hydration to a dry material will result in the desired fluffy, pulverulent lime hydrate free from heavy and gritty constituents.

An important application of this process, apart from the one heretofore discussed, would be the conversion of various industrial by-products that are essentially calcium hydroxide, but whose physical characteristics render them unsuitable for building materials, for example, which require a lime that is "fat" or plastic or both. Several examples may be given of waste materials whose physical characteristics render them unfitted for building purposes or for industrial uses where a finely divided lime is desirable, but which are readily converted by my process to a material with the desired characteristics. Among them are the lime wastes from certain metallurgical processes, sludges resulting from the generation of acetylene from calcium carbide and core wastes from lime plants. Materials like those above mentioned often are associated with varying amounts of inert foreign materials but that does not alter the application to them of the process hereinbefore outlined. It is thus seen that my process is one which is useful in altering the physical characteristics of various industrial by-products rendering them fit for uses that they otherwise would not know.

My concept includes both a new product and a new method. The product may be somewhat varied in its actual constituency and probably will, but to such degree as my invention is faithfully adhered to it will be of maximum efficiency. My method is undoubtedly variable in order and degree, but I have indicated the basis of the improvement and different condition of stone or product may be easily met by those skilled in the art.

What I therefore claim and desire to secure by Letters Patent is:—

1. The process of producing a lime for plaster product which consists in slaking calcined limestone, in freeing the product from imperfectly slaked portions, in adding an ingredient of ultimate retardant tendency, and in recalcining.

2. The process of producing a lime for plaster product which consists in slaking calcined limestone, in causing all constituents to satisfy their affinity for water, in adding an ingredient of ultimate retardant tendency, and in recalcining.

3. That process of producing a novel lime product which consists in slaking quicklime or the like with an excess of water, in separating from it a substantial portion of the slow slaking constituents, in adding thereto a material forming on calcination a water soluble retardant and calcining the resultant mixture above the temperature of decomposition of the hydrated lime to effect decomposition thereof.

4. That process of producing a novel lime product which consists in slaking quicklime or the like, in adding thereto a material forming upon calcination a water soluble retardant and calcining the resultant mixture above the temperature of decomposition of the hydrated lime to effect decomposition thereof.

5. In the production of a novel quicklime, those steps which consist in hydrating previously burned limestone or the like, in mixing therewith a water soluble compound adapted to form upon calcination a water soluble retardant coating for the lime particles and in recalcining.

In testimony whereof I affix my signature.
WESLEY C. L. HEMEON.